(12) United States Patent
Xu et al.

(10) Patent No.: US 7,944,115 B2
(45) Date of Patent: May 17, 2011

(54) TRAVELING WAVE GRIDS WITH AGITATED SURFACE USING PIEZOELECTRIC EFFECT AND ACOUSTIC TRAVELING WAVES

(75) Inventors: Baomin Xu, San Jose, CA (US); Meng H. Lean, Santa Clara, CA (US); Scott Jong Ho Limb, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/777,402

(22) Filed: May 11, 2010

(65) Prior Publication Data
US 2010/0219047 A1 Sep. 2, 2010

Related U.S. Application Data

(62) Division of application No. 11/501,898, filed on Aug. 8, 2006, now Pat. No. 7,764,005.

(51) Int. Cl.
*H01L 41/04* (2006.01)

(52) U.S. Cl. ............... 310/313 R; 310/316.02; 310/328

(58) Field of Classification Search .............. 310/313 R, 310/313 A, 313 B, 313 C, 313 D, 316.02, 310/322, 328, 334; 134/1.3
See application file for complete search history.

(56) References Cited

U.S. PATENT DOCUMENTS

| | | | |
|---|---|---|---|
| 6,029,518 A | 2/2000 | Oeftering | |
| 6,046,527 A | 4/2000 | Roopnarine et al. | |
| 6,149,789 A * | 11/2000 | Benecke et al. | 204/547 |
| 6,895,645 B2 | 5/2005 | Xu et al. | |
| 6,969,160 B2 | 11/2005 | Lean et al. | |
| 9,964,201 | 11/2005 | Xu et al. | |
| 7,054,054 B1 | 5/2006 | Srinivasan et al. | |
| 7,081,192 B1 | 7/2006 | Wang et al. | |
| 7,365,473 B2 * | 4/2008 | Vermeulen et al. | 310/313 R |
| 2004/0164650 A1 | 8/2004 | Xu et al. | |
| 2004/0251135 A1 | 12/2004 | Lean et al. | |
| 2004/0251136 A1 | 12/2004 | Lean et al. | |
| 2004/0251139 A1 | 12/2004 | Lean et al. | |
| 2005/0000863 A1 | 1/2005 | Lean et al. | |
| 2005/0024446 A1 | 2/2005 | Lean et al. | |
| 2005/0123930 A1 | 6/2005 | Lean et al. | |
| 2005/0123992 A1 | 6/2005 | Volkel et al. | |
| 2005/0247564 A1 | 11/2005 | Volkel et al. | |
| 2005/0247565 A1 | 11/2005 | Hsieh et al. | |
| 2006/0038120 A1 | 2/2006 | Lean et al. | |
| 2006/0092234 A1 | 5/2006 | Lean et al. | |
| 2006/0121555 A1 | 6/2006 | Lean et al. | |
| 2006/0132893 A1 | 6/2006 | Srinivasan et al. | |
| 2008/0042516 A1 | 2/2008 | Xu et al. | |

OTHER PUBLICATIONS

Follstaedt, S.C. et al., "Protein Adhesion on SAM Coated Semiconductor Wafers: Hydrophobic Versus Hydrophilic Surfaces", *Sandia Report*, SAND2000-3016 (2000).

(Continued)

*Primary Examiner* — Derek J Rosenau
(74) *Attorney, Agent, or Firm* — Fay Sharpe LLP

(57) ABSTRACT

A system for transporting particles includes a substrate and a plurality of spaced electrically conductive electrodes carried by the substrate. Further included is a carrier medium adapted for the retention and migration of particles disposed therein, wherein the carrier medium is in operational contact with the electrodes, and a vibration generator is positioned in relation to the substrate to impart vibrations into the carrier medium. In an alternative embodiment, the vibration generator is configured to generate an acoustic traveling wave, which includes a vibration component and a motivation component.

18 Claims, 9 Drawing Sheets

OTHER PUBLICATIONS

Zhang, M. et al., "Protein and cells on PEG immobilized silicon surfaces", *Biomaterials*, 19, 953-960 (1998).

Kingshott, P. et al., "Covalent Attachment of Poly(ethylene glycol) to Surfaces, Critical for Reducing Bacterial Adhesion", *Langmuir*, 19, 6912-6921 (2003).

* cited by examiner

TRAVELING WAVE GRIDS WITH AGITATED SURFACE USING PIEZOELECTRIC EFFECT AND ACOUSTIC TRAVELING WAVES

INCORPORATION BY REFERENCE

This is a divisional of and claims priority to application U.S. Ser. No. 11/501,898, filed Aug. 8, 2006, entitled "Traveling Wave Grids With Agitated Surface Using Piezoelectric Effect And Acoustic Traveling Waves", by Baomin Xu et al., the disclosure of which is hereby incorporated by reference in its entirety.

STATEMENT REGARDING FEDERALLY SPONSORED RESEARCH OR DEVELOPMENT

This invention was made with United States Government support under Cooperative Agreement No. W911NF-04-C-0040 awarded by the United States Army. The United States Government has certain rights in the invention.

BACKGROUND

The present application relates to the field of traveling wave grids, and more particularly, to improving movement and control of organic, inorganic and/or biological particles being carried by the traveling wave grids to focus, separate and/or concentrate the particles.

It is desirable to move the particles for a variety of reasons. For example such movement is useful in applications related to, among others, analysis of proteins and DNA fragment mixtures, and methodologies used for processes such as DNA sequencing, isolating active biological factors associated with diseases such as cystic fibrosis, sickle-cell anemia, myelomas, and leukemia, and establishing immunological reactions between samples on the basis of individual compounds. Movement by traveling wave grids is an extremely effective tool because, among other attributes, it does not affect a molecule's structure, is highly sensitive to small differences in molecular charge and mass, and will not damage the cells of biological materials.

Traveling wave grids manipulate particles by subjecting them to traveling electric fields. Such traveling fields are produced by applying appropriate voltages of suitable frequency and phase to electrode arrays of suitable design, such that non-uniform electric fields are generated.

Thus, by use of traveling wave grids, particles are manipulated and positioned at will without physical contact, leading to new methods for focusing, separation and concentration technology.

It has been appreciated, however, that with existing and previously proposed traveling wave grid devices the particles, including organic, inorganic and bio-materials, within the carrier medium, may settle and adhere to the surface of the traveling wave grid due, for example, to Van der Waals bonding, leading to loss in the amount of a sample and compromising long term reliability.

INCORPORATION BY REFERENCE

U.S. Patent Application Publication No. US2004/0251135A1 (U.S. Ser. No. 10/459,799, Filed Jun. 12, 2003), published on Dec. 16, 2004, by Meng H. Lean et al., and entitled, "Distributed Multi-Segmented Reconfigurable Traveling Wave Grids for Separation of Proteins in Gel Electrophoresis"; U.S. Patent Application Publication No. US2004/0251139A1 (U.S. Ser. No. 10/460,137, Filed Jun. 12, 2003), published on Dec. 16, 2004, by Meng H. Lean et al., and entitled, "Traveling Wave Algorithms to Focus and Concentrate Proteins in Gel Electrophoresis"; U.S. Patent Application Publication No. US2005/0123930A1 (U.S. Ser. No. 10/727,301, Filed Dec. 3, 2003), published on Jun. 9, 2005, by Meng H. Lean et al., and entitled, "Traveling Wave Grids and Algorithms for Biomolecule Separation, Transport and Focusing"; U.S. Patent Application Publication No. US2005/0123992A1 (U.S. Ser. No. 10/727,289, Filed Dec. 3, 2003), published on Jun. 9, 2005, by Volkel et al., and entitled, "Concentration and Focusing of Bio-Agents and Micron-Sized Particles Using Traveling Wave Grids"; U.S. Publication No. US 2004-0164650 A1 (U.S. Ser. No. 10/376,544, Filed Feb. 25, 2003), published Aug. 26, 2004, by Xu et al., and entitled "Methods to Make Piezoelectric Ceramic Thick Film Array"; U.S. Pat. No. 6,964,201, issued Nov. 15, 2005, by Xu et al., and entitled, "Large Dimension, Flexible Piezoelectric Ceramic Tapes"; and U.S. Pat. No. 6,895,645, issued May 24, 2005, by Xu et al., and entitled, "Bimorph Mems Devices", each hereby incorporated herein by reference in their entireties.

BRIEF DESCRIPTION

A system for transporting particles includes a substrate and a plurality of spaced electrically conductive electrodes carried by the substrate. Further included is a carrier medium adapted for the retention and migration of particles disposed therein, wherein the carrier medium is in operational contact with the electrodes, and a vibration generator is positioned in relation to the substrate to impart vibrations into the carrier medium.

In an alternative embodiment, the vibration generator is configured to generate an acoustic traveling wave, which includes a vibration component and a motivational component.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
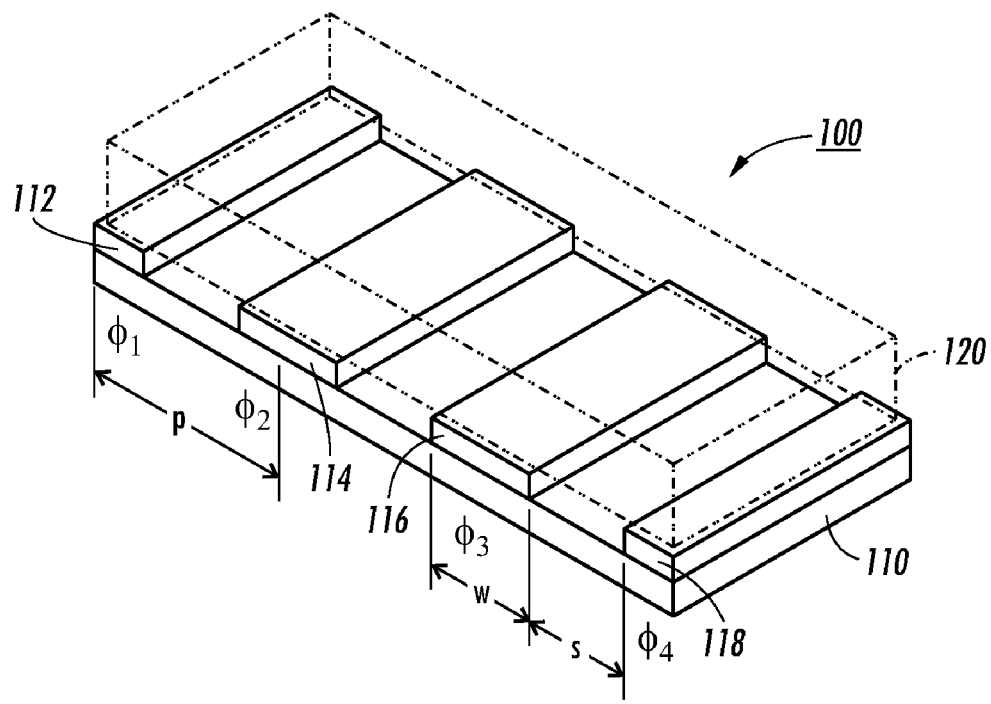
FIG. 1 is a schematic illustration of a preferred single sided traveling wave grid configuration.

FIG. 1 is a single sided traveling wave grid device 100, such as an electrostatic traveling wave grid, comprising a plate 110, a plurality of parallel and closely spaced electrodes 112, 114, 116, and 118, and an effective amount of a carrier medium 120, of liquid or gel disposed in communication with the electrodes. In one design, the electrodes may be formed from platinum or alloys thereof. A thin layer of titanium may be deposited on the plate, which may be glass, to promote adhesion between the electrodes and plate. A four (4) phase electrical signal ($\Phi1$-$\Phi4$) is shown as being utilized in conjunction with assembly 100. Accordingly, a first electrode such as electrode 112 may be utilized for a first phase $\Phi1$ of the electrical signal. Similarly, a second electrode immediately adjacent to the first, such as electrode 114, may be utilized for a second phase $\Phi2$ of the electrical signal. And, a third electrode immediately adjacent to the second electrode, such as electrode 116, may be utilized for a third phase $\Phi3$ of the electrical signal. Moreover, a fourth electrode immediately adjacent to the third electrode, such as electrode 118, may be utilized for a fourth phase $\Phi4$ of the electrical signal. The distance between the centers of adjacent electrodes is referred to as pitch, and denoted as "p." The width of an electrode is denoted as "w." And the distance between facing sidewalls or edges of adjacent electrodes is "s." It is to be appreciated the above concepts may be used to form a double sided grid assembly which employs a second design similar to that as described and located so as the two surfaces are on either side of the carrier medium.

Figure 2:
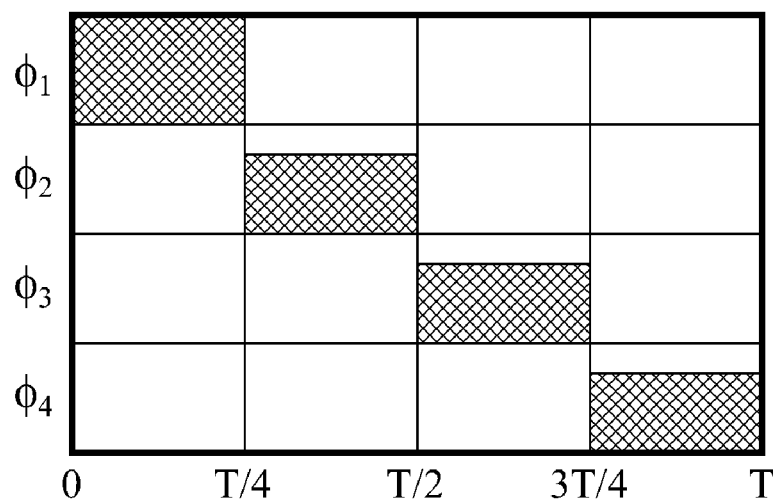
FIG. 2 is a representative four phase traveling wave voltage pattern employed in the preferred systems and traveling wave grids.
Figure 3:
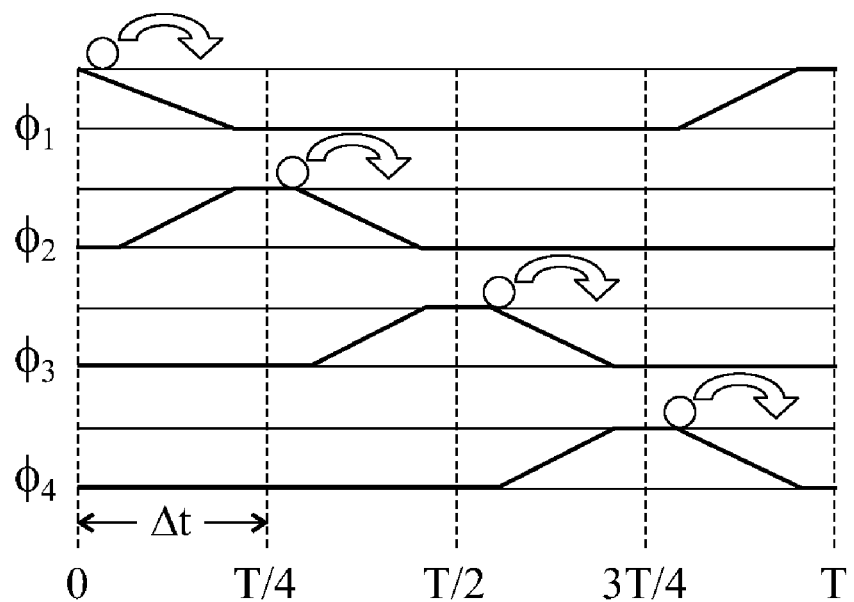
FIG. 3 is a schematic illustration of biomolecule transport from one electrode to another.

FIG. 2 is a representative four phase voltage pattern or waveform used in the assembly 100. Specifically, FIG. 2 depicts the four phase voltage waveform with 90 degree separation between phases. Each waveform occurring in each phase is a square wave pulse. Each pulse is sequentially applied to an adjacent electrode. Thus, a first pulse in phase $\Phi1$, is applied to a first electrode for a desired time period, such as T/4. Upon completion of that first pulse, such as at time T/4, a second pulse in phase $\Phi2$ is applied to a second electrode, immediately adjacent to the first electrode. Upon completion of that second pulse, such as at time T/2, a third pulse in phase $\Phi3$ is applied to a third electrode, immediately adjacent to the second electrode. Upon completion of that third pulse, such as at time 3T/4, a fourth pulse in phase $\Phi4$ is applied to a fourth electrode, immediately adjacent to the third electrode. This sequential and ordered array of voltage pulsing results in organic, inorganic or bio-material particles dispersed in the liquid to "hop" from the vicinity of one electrode to another. The synchronous mode of propagation is depicted in FIG. 3 and may be described as a "hopping" mode where the organic, inorganic or bio-material particles hop from electrode to electrode in the direction of the pulse train. The transit time to migrate across the dielectric space is then given by:

$$t_{transit} = s/\mu E,$$

where pitch is given by p=w+s, and w and s are the electrode width and dielectric space, respectively. Electric field and mobility are given by E and $\mu$, respectively. The period for one cycle through the four phases is $4*t_{transit}$, so that the maximum sweep frequency is:

$$f < \mu E/4s.$$

For sustained transport, the organic, inorganic or bio-material particles have to have sufficient speed ($\mu E$) and time ($t_{transit}$) to traverse the distance of the dielectric space, s. This equation implies that for sustained transport, there is a critical frequency for organic, inorganic or bio-material particles of a certain mobility. Therefore, by starting with the highest operational frequency, one can progressively scan downwards in frequency until the organic, inorganic or bio-material particle of the right mobility starts to move. This means that for certain organic, inorganic or bio-material particles, the fastest (and lowest molecular weight) particles, e.g. biomolecules, may be separated out from the sample one at a time. The preceding discussion describes one particular use of the wave grid.

Figure 4:
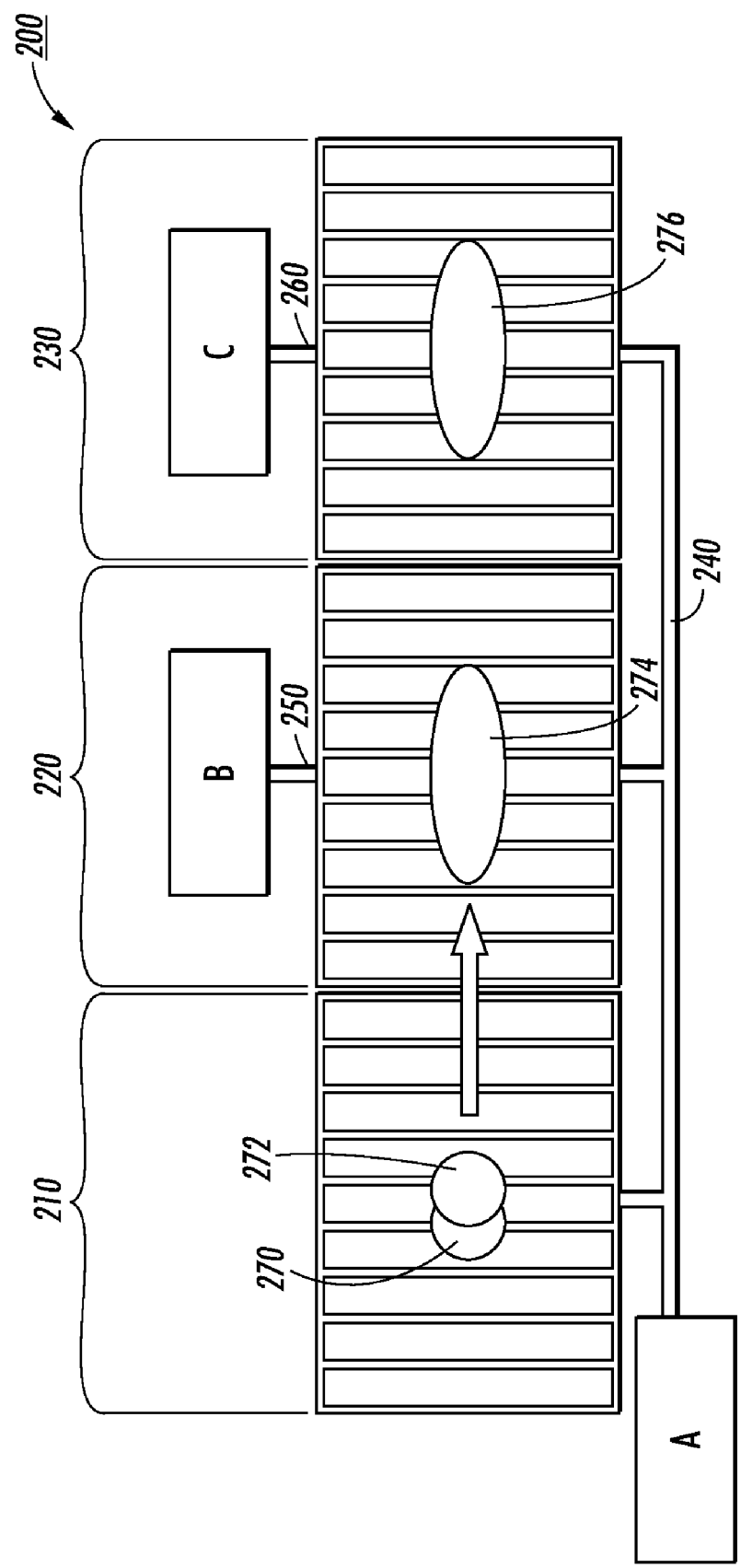
FIG. 4 is a schematic illustration of a preferred embodiment electrophoretic system utilizing distributed, reconfigurable, and reprogrammable traveling wave grids.

The present concepts, however, provide significant opportunity for other uses, as well as innovation in the design of specific systems of traveling wave grids to focus, separate, and concentrate organic, inorganic and bio-material particles. One strategy is to fabricate the smallest pitch possible for the traveling wave grids for maximum flexibility in reconfiguring the grids for specific applications. FIG. 4 is a schematic illustration of an electrophoretic traveling wave grid system (device) 200 utilizing multiple distributed, reconfigurable, and reprogrammable traveling wave grids. Specifically, the multi-segmented traveling wave grid system includes a first grid segment 210, a second grid segment 220, and a third grid segment 230. As will be appreciated, each segment includes a plurality of parallel and closely spaced electrodes. Two contiguous pads on respective sides together offer connection to the four phase circuit through one or more buses 240, 250, and 260. The system 200 preferably further includes one or more programmable voltage controllers such as controllers A, B, and C. As will be appreciated, the controllers are in electrical communication with the traveling wave grid (or segments thereof) through the noted buses.

In utilizing system 200, one particular strategy involves moving organic, inorganic or bio-material particles of interest onto individual local traveling wave grid segments using controller A where they are then available for subsequent processing using controllers B, C and so forth. Each controller may be a separate peripheral interface controller (PIC) implementation or a single PIC with multiple pre-programmed instructions. For example, in operation, system 200 of FIG. 4 may be utilized to separate a sample of various bio-molecules (of bio-material or other type of particles) as follows. A sample 270 is deposited onto the grid segment 210. The sample migrates to region 272 and continues to migrate onto adjacent grid segment 220. Operation of system 200 continues until a region 274 of bio-molecules forms within grid 220. Depending upon the bio-molecules and grid parameters, the bio-molecules constituting region 274 may further migrate to adjacent grid segment 230, and form a region 276 of bio-molecules. Generally, this strategy utilizes an initial separation using a first controller and secondary refinements or further separation using other controllers and segments of grids. Secondary refinements include further concentrating of migrated bio-molecules and focusing of bands or patches.

The traveling wave grid devices described above, and in the above incorporated materials, may be used in connection with a number of operations and are effective in translating a carrier medium within a layer of thickness equal to 5 times the spatial pitch of the traveling wave grid.

An issue, with the previously described traveling wave grid devices is the adhesion of organic, inorganic and bio-material particles contained in the carrier medium, to surfaces of the traveling wave grid devices. Such adhesion may occur due to Van der Waals bonding for particles which have fallen to a device surface. This adhesion will lead to loss in the amount of sample material and compromise long-term reliability.

One way to address the adhesion issue is to employ specialized coatings, to form enthalpic or entropic barriers to decrease particle adhesion. Another possible procedure to reduce adhesion is by use of low amplitude vibrations, such as signals at ultrasonic or other appropriate frequencies.

Anti-adhesion through the use of surface coating of substrates has been reported in the literature not just for different types of cells and bacteria but also for proteins and therefore simulants for viruses and toxins. Follstaedt et al. studied the absorption of bovine serum albumin (BSA) on silicon wafers coated either with a hydrophilic Polyethylene Glycol (PEG) surface for 24 hours with a 0.1 mM solution of BSA, found that both types of monolayers reduced the adsorption of protein compared to the bare Si surface. In addition, the adsorbed protein layer measured by ellipsometry was thinnest in the case of the PEG surface coating. (See, Follstaedt, S. C., Last, J. A., Cheung, D. K., Gourley, P. L., Sasaki, D. Y., "Protein adhesion on SAM coated semiconductor wafers: Hydrophobic versus hydrophilic surfaces" Sandia Report, SAND2000-3016 (2000)).

Zhang et al. studied the adsorption rates of BSA and two different human cell lines (lung fibroblast and epithelial cells) on PEG coated silicon surfaces as a function of exposure times. Their experiments showed a strong increase in adsorption within the first 10 minutes, and a very slow increase thereafter. They found that after 2 hours the reductions of BSA, epithelial and fibroblast cell adsorption onto PEG treated surfaces compared to untreated silicon surfaces were 76%, 82%, and 64%, respectively. (See, Zhang, M., Desai, T., Ferrari, M., "Protein and cells on PEG immobilized silicon surfaces", Biomaterials, 19, 953-960 (1998)).

Kingshott et al. reported improvements in reducing adhesion of a Gram-negative Pseudomonas sp. on PEG coated surfaces as compared to controls. They also showed that such reductions are only possible if the PEG layer is covalently bonded to the substrate. It was speculated this was necessary to overcome the possible deleterious biodegradation mechanisms that opportunistic bacteria use to colonize surfaces. Another possible reason for the poor anti-adhesion properties of non-covalently bound PEG is its hydrophilic nature which allows it to dissolve into the buffer solution over time. Also, due to its synthetic nature, PEG is a poor food source for bacteria, thus reducing the risk of bacterial potentiation or virus transmission. (See, Kingshott, P., Wei, J., Bagge-Ravn, D. Gadegaard, N., Gram, L., "Covalent Attachment of Poly (ethylene glycol) to Surfaces, Critical for Reducing Bacterial Adhesion" Langmuir, 19, 6912-6921 (2003)).

To verify the effectiveness of specialized coatings and ultrasonic energy from stopping particles from bonding and/or adhering to traveling wave grid surfaces, and removing particles which have become bound and/or adhered, applicants performed preliminary proof of concept experiments which tested for particle amounts on the surface of coated and uncoated substrates in static and ultrasonic baths.

In connection with these experiments, it is considered that Polyethylene Glycol (PEG) self-assembled monolayer coatings on SiO2 surfaces will reduce bacteria adhesion compared to uncoated samples. However, and as will be seen by the following experiments, although coating of the substrate does increase anti-adhesion, greater anti-adhesion behavior is obtainable. In addition, while a particular surface coating may be effective for one type of particle, other particles, may behave differently. In the following experiments, applicants use Arizona Road Dust (ARD), which is Arizona sand ranging in size from approximately 1 to 20 μm diameter, and which has been used for many years in testing of products and processes such as air filters, etc. Other names by which the sand is known is Arizona Silica, AC Fine and AC Coarse Test Dust, SAE Fine and Coarse Test Dusts, J726 Test Dusts, among others.

In order to attempt to improve anti-adhesion, the present experiments further applied ultrasonic energy to the substrates. The effectiveness of this process was first tested on Si wafers.

The experimental protocol employed three different liquid baths to test the effect of ultrasonic bath energy. The liquids were de-ionized (DI) water, bacteria solution, and ARD solution. The substrates used in the experiments were 4" Si wafers with and without PEG coatings. The effectiveness of this method was measured using a KLA-Tencor Surfscan 4500 (from KLA-Tencor Corporation), which allows for an automatic scan using a laser to detect surface particles. Because the tool cannot distinguish between bacteria and ARD, it detects and counts all particles on the surface, and determines the effective cross-sectional area of the particles. Also the entire wafer is scanned providing data from a large surface area. As for the ultrasonic tool, a LR Quantrax 210H Ultrasonic Bath (from L. R. Quadrex Corporation) was used with a setting of 43 kHz and 135 watts. All soaks with and without ultrasound were done in a Petri dish with 60 to 80 ml of liquid.

The PEG coating was covalently bound to the silicon wafer using N-(triethoxysilylpropyl)-Opolyethylene oxide urethane (which may be obtained, for example, from Gelest Inc.). The silicon wafer was soaked in a solution of 60 ml Toulene, 0.5 ml Hexylamine, and 1.0 ml PEG for 30 minutes. After the soaking the wafers were thoroughly rinsed with toluene, acetone, and isopropyl alcohol (IPA).

An ARD solution of 0.01 gm/ml was used and 2 ml of the solution was added for every 60 ml of $H_2O$. A concentrated solution of B. thuringiensis suspended in tap water was used as the bio-agent B. anthracis simulant. Twenty mL of the solution was added to 60 ml of $H_2O$. All wafers were thoroughly rinsed with water and blown dry with $N_2$ after each soak.

In a first part of the experiment, Arizona Road Dust (ARD) solutions were used to determine the effect of static and ultrasonic agitation treatment on PEG coated and non-PEG coated Si wafers. Three wafers were labeled PEG-21, PEG-22, and Si-25. PEG-21 and PEG-22 refer to the PEG coatings prepared on separate occasions and Si-25 was a bare silicon wafer.

Figure 5:
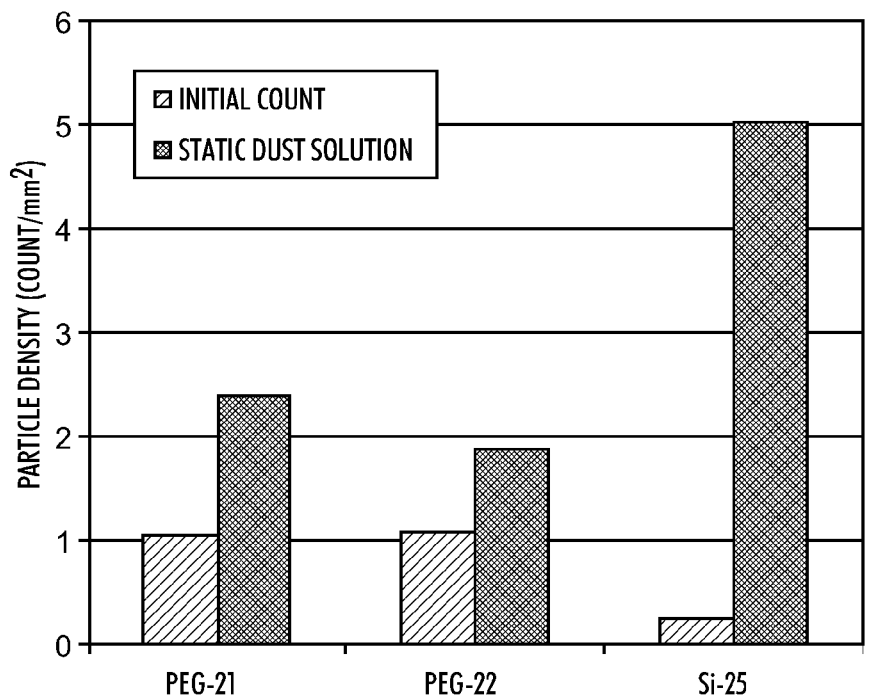
FIG. 5 charts the particle density for PEG coated and uncoated Si wafers, for a static soak in an ARD solution.
Figure 6:
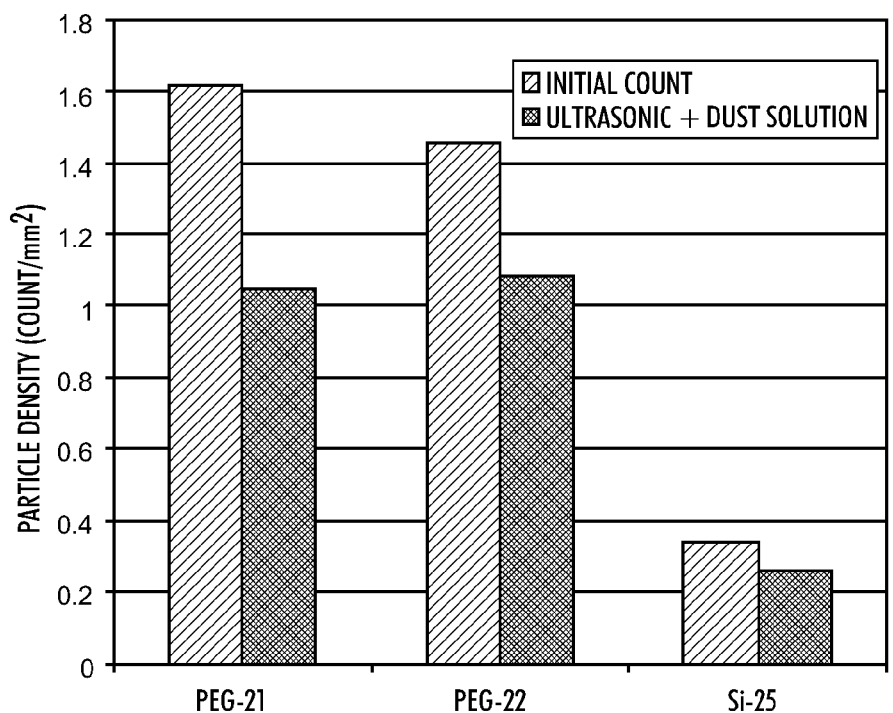
FIG. 6 charts particle density for PEG coated and uncoated Si wafers, for an ultrasonic soak in an ARD solution.

FIG. 5, presents the results for static tests, i.e., without use of an ultrasonic bath, and FIG. 6 provides data for the ultrasonic soak tests. All soaks were for 5 minutes and particles greater than 6 $\mu m^2$ in area were counted using the Surfscan 4500 wafer particle counter (from KLA-Tencor Corporation). Particle densities before and after soaking were compared.

The chart of FIG. 5 verifies the static bath allowed particles to settle and adhere to the Si wafer. The largest particle accumulation was on the untreated bare silicon wafer (Si-25) where the particle density increased by ~5 counts/mm$^2$. As for the PEG treated silicon wafers (PEG-21 and PEG-22), the particle increase was much less, only increasing the density by ~1 count/mm$^2$. Thus, the experiments showed the PEG coated samples (PEG-21 and PEG-22) performed better than the untreated wafer (Si-25).

In contrast to the increase of particle counts after the static soak (as shown in FIG. 5), the particle counts, as shown in FIG. 6, decreased after soaking in the ultrasonic bath. Effectively, the ARD solution ultrasonic bath did not result in any additional particles for both the PEG coated (PEG-21 and PEG-22) and uncoated (Si-25) samples.

Figure 7:
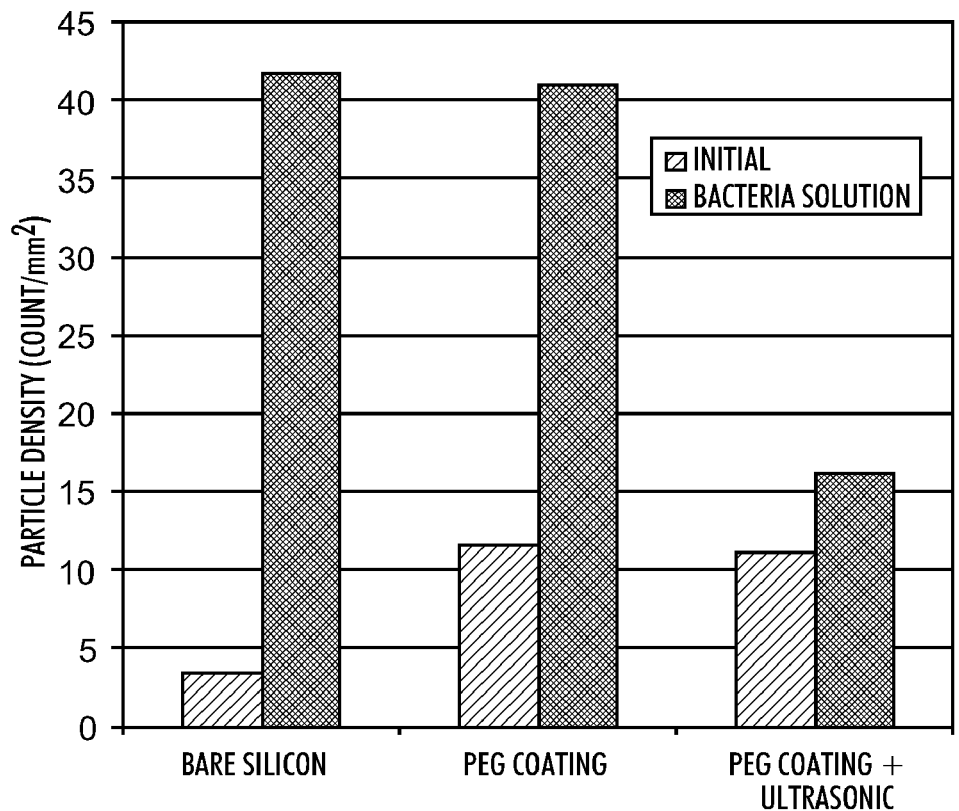
FIG. 7 charts particle density for PEG coated and uncoated Si wafers, for static and ultrasonic soaked material in a bacteria solution.

Turning to tests reflected by the results shown in FIG. 7, wafers soaked in bacteria solutions for 30 minutes were measured for particles. An untreated Si wafer (Bare Silicon) and a PEG treated Si wafer (PEG Coating) were soaked under static conditions. Additionally, a PEG treated Si wafer was tested in an ultrasonic bath with the bacteria solution (PEG Coating+Ultrasonic). FIG. 7 illustrates before and after soak measurements of the three different conditions. As shown, the untreated Si wafer had the highest particle density increase of ~38 counts/mm$^2$. The PEG coated wafer had an increase of ~29 counts/mm$^2$ and the PEG coated ultrasonic bath wafer had an increase of only of ~5 counts/mm$^2$. As can be seen by the results, adding the ultrasonic bath increased the anti-adhesion effects.

Further experiments on comparing different PEG coatings confirm that, among commercially available PEG formulas, e.g. PEG4-6 (a short chain polymer) and PEG6-9 (a long chain polymer), and a mixture prepared in-house of 50:50 PEG4-6 and PEG6-9, the PEG4-6 performed best in the anti-adhesion tests. One explanation for better performance may be improved surface coverage with PEG4-6. If contact angle is an indication of film coverage, then higher wetting angles from PEG4-6 coatings would suggest better surface coverage.

The ultrasonic bath and static bath experiments showed that anti-adhesion performance is improved with an applied ultrasonic energy to the surface of a Si wafer, and that it would be difficult to prevent ARD adhesion using PEG surface coatings alone. The ultrasonic approach has been shown to improve prevention of ARD adhesion. It has also been determined the combination of a coated surface along with ultrasonic energy improves anti-adhesion of ARD and bacteria.

The above experiments verify that using ultrasonic bath can improve the surface anti-adhesion, but the bulky ultrasonic bath can not easily be directly integrated with the traveling wave grid device as shown in FIG. 1 or 4 to form a compact or portable device. The use of ultrasonic bath is basically to apply ultrasonic energy to the liquid and the substrate to generate mechanical vibrations, in principle if other methods can be used to generate similar vibrations, the same anti-adhesion effect can be reached. Thus, attention is now directed, to FIG. 8, which illustrates a traveling wave grid device 300 incorporating a vertical vibration generator. Traveling wave grid device 300, shown in a simplified side view, has components similar to that discussed in connection with FIGS. 1 and 4. Particularly, a substrate made from glass or other insulating material 310 carries a plurality of traveling wave electrodes 312 (the power connections are not shown for convenience of explanation). In addition to the components of existing traveling wave grid devices, this embodiment further includes a piezoelectric material 314 having electrodes 316, 318 located under glass substrate 310. In this embodiment, piezoelectric material 314 is a continuous sheet of piezoelectric material, such as ZnO, piezoelectric polymers, or piezoelectric ceramics. An energization (e.g., power) source 320 is connected to electrodes 316, 318 of piezoelectric material 314. By activation of power source 316, piezoelectric material 314 will become energized, causing vertical vibrations 322 to be directed toward and through the surface of glass substrate 310, and into carrier medium 328. By this arrangement, particles, such as particles 324 and 326 within carrier medium 328 are intersected and affected by vertical vibrations 322. Particularly, particles 324 suspended within carrier medium 328, and do not come into contact with the surface of traveling wave grid device 300. In this situation, the vertical vibration 322 generated by piezoelectric material 314 and power source 320, which may be considered components of the vertical vibration generator, stop particles 324 from coming into contact with the surface of device 300. Thus, the vertical vibration components act to eliminate contact between the surface and the particles from occurring. Additionally, in situations where particles have adhered to the surface of device 300, vertical vibrations 322 act to remove such particles 326 by, for example, breaking the Van der Waals bonds. Thus integrating the vertical vibration components (314, 316, 318, 320) into the traveling wave grid device 300, permits not only the breaking of bonds between particles and the surface of device 300, but also prevents contact between particles 324 within the medium 328 and surface of device 300.

Figure 8:
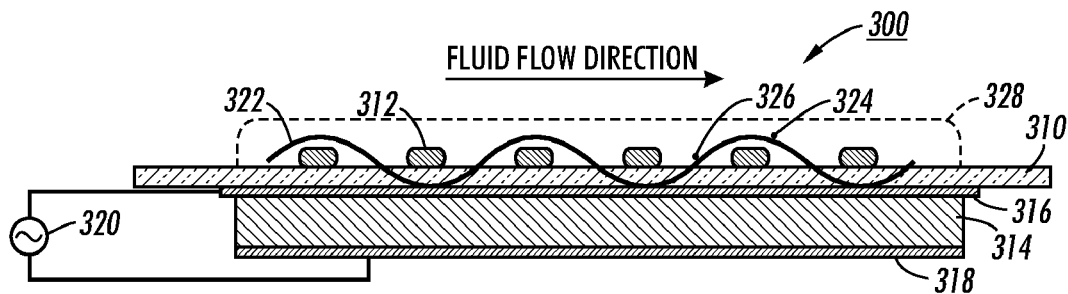
FIG. 8 depicts a traveling wave grid with a full piece of piezoelectric material attached to the bottom surface.
Figure 9:
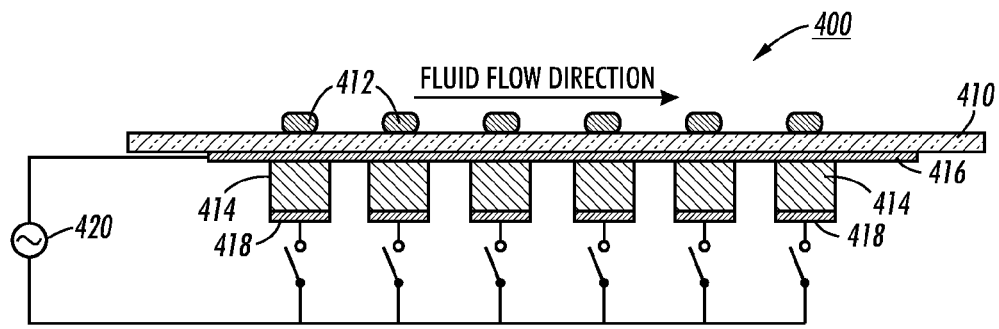
FIG. 9 is a traveling wave grid with discrete pieces of piezoelectric material attached to the bottom surface.

Turning to FIG. 9, illustrated is another traveling wave grid device 400, including substrate 410 made from glass or other insulating materials and traveling wave electrodes 412, which also incorporates a vertical vibration generator located on the bottom surface of the traveling wave grid device 400. The embodiment employs discrete pieces of piezoelectric material 414 having electrodes 416, 418. Electrodes 416 are connected together as a common current return path and connected to the power source 420. Each of the discrete pieces of piezoelectric material 414 also includes a corresponding discrete electrode 418. This arrangement permits selected connection of electrodes 418 to a power source 420, which in turn permits for selective energization of the discrete pieces of piezoelectric material 414. Thus, a distinction between the devices of FIG. 8 and FIG. 9, is that upon application of power by power source 320 of FIG. 8, vertical vibrations occur over the length of the traveling wave grid device 300. However, operation of traveling wave grid device 400 of FIG. 9 permits this embodiment to allow distributed and local control of vibrations for the traveling wave grid.

As will be expanded upon below, the continuous sheet of piezoelectric material 314 of FIG. 8 and the discrete pieces of piezoelectric material 414, may be attached or grown on the substrates 310, 410. The substrates may have a surface conductive layer, on the bottom surface, which works as part of the electrodes of the piezoelectric material or makes the connection of the piezoelectric material to the power source more easily. Also, in some cases, the surface of the devices may be considered the top surfaces of the electrostatic traveling wave grid device described above and in the following may be considered the top surfaces of the substrates and/or electrodes, or in other designs, when there is a protective cover such as a PEG covering (not shown), the surface may be made of this material.

Figure 10:
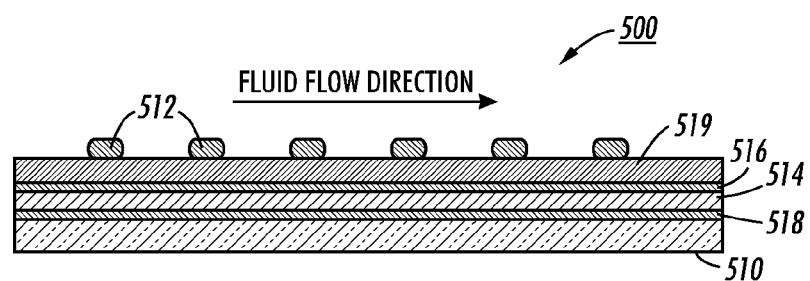
FIG. 10 depicts a traveling wave grid with a full piece of piezoelectric material/dielectric layer on a top surface.
Figure 11:
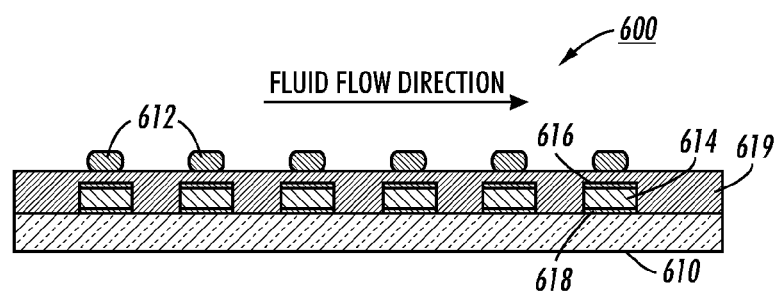
FIG. 11 depicts a traveling wave grid with discrete pieces of piezoelectric material and a dielectric layer on the top surface.

Turning now to FIGS. 10 and 11, in addition to having piezoelectric material on the bottom surface of the traveling wave grid device, it is also possible to attach or grow piezoelectric material on the top surface of the traveling wave grid device. For example, as shown by the embodiment of FIG. 10, a traveling wave grid device 500 is built with a glass substrate 510 and electrodes 512, as in previous designs. However, in this configuration piezoelectric material (ZnO layer or PZT layer) 514 (with electrodes 516, 518) is located on a top surface of the glass substrate 510.

After attaching or growing the piezoelectric material layer 514, a thin dielectric layer 519, such as Parylene, silicon oxides or silicon nitrides or other appropriate material is deposited to isolate operation of the vertical vibration generator from traveling wave grid electrodes 512. Traveling wave electrodes 512 are formed on the surface of dielectric layer 519. Electrodes 516, 518 are connected to a power source (not shown) by extending conductive lines (not shown) from the electrodes 516, 518 at edges of the device. Thus, the embodiment of FIG. 10 discloses a continuous sheet of piezoelectric material on the top surface of the traveling wave grid device.

Turning now to FIG. 11, depicted is another embodiment, similar to FIG. 10, but where the traveling wave grid device 600, having the glass substrate 610 and traveling wave electrodes 612, uses several discrete pieces of piezoelectric material 614 (and electrodes 616 and 618) on the top surface of the traveling wave grid device. A thin dielectric layer 619 is deposited onto the piezoelectric material 614. In this design, the electrodes 616, 618 are connected to a power source (not shown) by conductive lines (not shown) extending out from sides of the device. Particularly, the conductive lines may extend out of the page.

In both embodiments of FIGS. 10 and 11, vertical vibrations are generated such as discussed in connection with FIGS. 8 and 9, to both stop particles from contacting the surface of the traveling wave grid device, and for breaking bonds holding particles to the surface of such device. Also, while power sources and connections are not shown in FIGS. 10 and 11, they are similar to those shown in FIGS. 8 and 9.

Depending on the application, thin film, thick film or bulk piezoelectric materials can be used, but a specific embodiment could be the use of thick films. In this embodiment, the thick films may be developed by a screen printing laser transfer process, such as taught in U.S. Publication No. US 2004-0164650 A1, published Aug. 26, 2004; U.S. Pat. No. 6,964,201, issued Nov. 15, 2005; and U.S. Pat. No. 6,895,645, issued May 24, 2005, each previously incorporated herein by reference in their entireties, which allows for the transfer of discrete or continuous piezoelectric material such as PZT (lead zirconate titanate) thick film elements on the glass at very low cost.

The piezoelectric constant d33 of laser transferred PZT is about 300 pm/V or higher. Generally, a surface displacement of about 10 nm is sufficient to break Van der Waals bonding. Thus using about 30V to 40V, a surface displacement of 9 to 12 nm (using longitudinal mode) can be generated, which is sufficient surface agitation to achieve the desired de-bonding results. Applying 30V to 40V driving voltages to the piezoelectric material are fully acceptable for the traveling wave device. For one conventional embodiment, the thickness of the laser transferred PZT thickness is between 10 µm to 50 µm, and preferably 10 µm or, alternatively, about 50 µm.

The longitudinal resonant frequency of 50 µm-thick PZT is about 40 MHz. Thus, the vertical vibrations will operate at far below the resonant frequency, such as below 10 MHz, so that transfer of too large of vibrations and/or excessive mechanical energy into the carrier medium will be avoided. Again, if too large of vibrations and/or excessive mechanical energy are input to the carrier medium, this may damage or destroy the bio-materials in the carrier medium. Thus PZT elements will be operated under static condition and their displacement will in one embodiment not change with frequency but will linearly increase with a driving voltage. Depending on the specific organic, inorganic or bio-material particles, under the static driving condition, the driving voltage and frequency can be tuned to reach an optimized surface vibration, which will provide an optimal effect for specific organic, inorganic or bio-material particles.

Figure 12:
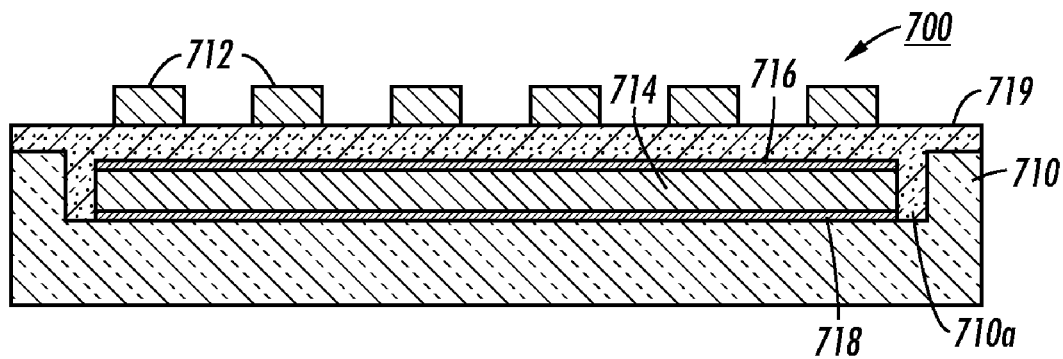
FIG. 12 depicts a traveling wave grid with a full piece of piezoelectric material/dielectric layer on an etched area of the substrate.

Turning to FIG. 12, illustrated is another traveling wave grid device 700, having a substrate 710 and traveling wave electrodes 712, and which also employs a vertical vibration generator to reduce particles from contacting or and/or adhering to the surface of the traveling wave grid device. While this embodiment shares many of the same attributes of the previous embodiment of FIG. 10, a distinction is that the glass substrate 710 is etched to have a recessed area 710a. It is within this recessed area 710a that piezoelectric material 714 is either deposited or grown. Piezoelectric material 714 has associated piezoelectric electrodes 716 and 718, which in one embodiment may be connected to a power source (not shown) by conductive lines which come out of the device at angles such as into and out of the page. Of course, other connection schemes may be used as would be known to one of ordinary skill in the art. A planarizing and/or dielectric material 719 is provided over piezoelectric material 714 and glass substrate 710 such that a planarized surface is presented on which the traveling wave grid electrodes 712 are formed. By this embodiment, a planar surface is presented for the electrodes, increasing the manufacturability of the present design.

Figure 13:
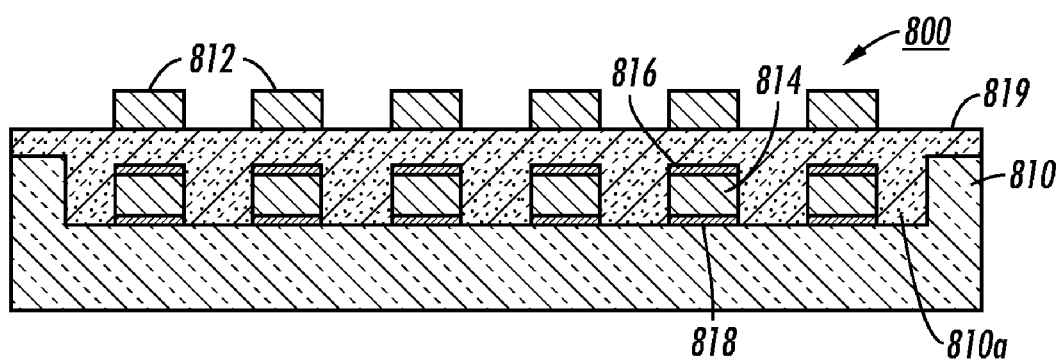
FIG. 13 depicts a traveling wave grid with discrete pieces of piezoelectric material and a dielectric layer on an etched portion of the substrate.
Figure 14A:
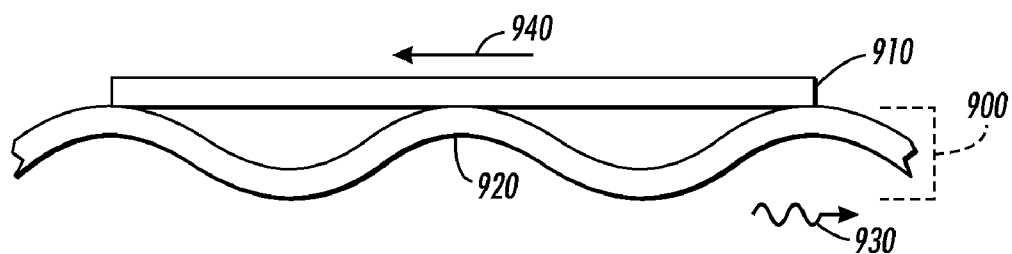
FIG. 14a provides a sketch of a mechanism for energy transfer from an acoustic wave (in a solid) to a block using friction contact.
Figure 14B:
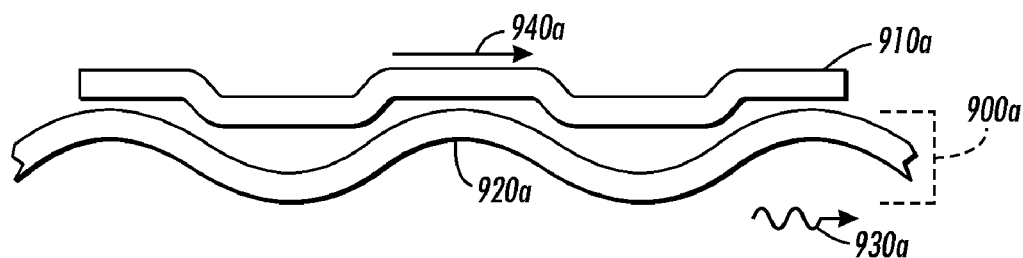
FIG. 14b is a sketch of a mechanism for energy transfer from an acoustic wave (in a solid) to a block using wave action.
Figure 14C:
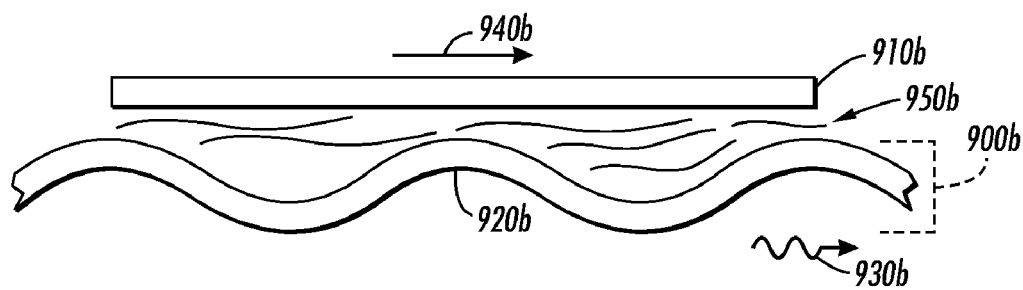
FIG. 14c depicts a sketch of a mechanism for energy transfer from an acoustic wave (in a solid) to a block, showing boundary layer interaction.

Turning to FIG. 13, another traveling wave grid device 800 is presented. In this design, and similar to FIG. 12, substrate 810 is manufactured to include a recessed area 810a. Thereafter, individual piezoelectric pieces 814 are attached or grown within recessed area 810a. Similarly, electrodes 816 and 818 are provided, and connections made, such that the pieces of piezoelectric material 814 may be controlled by a power source (not shown). After the piezoelectric pieces 814, electrodes 816, 818 and associated connections have been located within the etched area 810a, planarization and/or dielectric material 819 is provided over the piezoelectric material and glass substrate to permit the formation of the traveling wave grid electrodes 812.

Turning now to operation of the described traveling wave grid devices of FIGS. 8-13. Typically such devices are operated in several stages. During an initial system flush of a previous tested sample, the vibrations are tuned to a maximum value to dislodge any debris. The system is then primed and the sample volume is introduced. During a concentration or operational stage, the vibrations are set to a continuous, lower-than-maximum-value setting to prevent particles from settling to the surface and adhering thereto, and to dislodge attached particles. When the composition of the particles in the carrier medium are known, and the known particles are understood to react most optimally at a particular frequency and/or voltage, or an optimal range thereof, the power sources can be set at an appropriate frequency and/or voltage. On the other hand, if such optimal values are not known, the power source can be varied so that multiple levels of vibrations are provided.

The current concepts permit for compact devices compared to bulky ultrasonic baths. Also, since the traveling wave grid surface is being vibrated to break the Van der Waals bonding and to prevent settlement of particles, it works for many different materials, including organic, inorganic and biological. Typically a special surface coating layer (e.g., PEG) will only work on specific bio-agents. Thus, a combination of surface coating and applied vibrational energy enhances and improves anti-adhesion performance for all particles in a carrier medium.

As a further improvement, the following discussion discloses processes and devices which not only eliminate and/or reduce adhesion, but also permit for the adjustment or modification of the movement of the carrier medium. This additional capability is achieved by the use of an acoustic traveling wave (ATW).

The following discloses the generation of an acoustic traveling wave (ATW) on the surface of the traveling wave grid using piezoelectric materials, which travel along the surface co-planar with the electrostatic traveling wave grid. The ATW includes two functions to enhance operation of the device: (1) it generates vibrations on the traveling wave grid surface that can be used to prevent sedimentation or settlement of particles and acts to break Van der Waals bonds between the traveling wave grid surface and the particles; and (2) the ATW direction can be designed to move with or against the traveling wave grid in order to enhance or reduce particle transport capabilities.

It is known when an acoustic (or mechanical) traveling wave is generated on a surface and/or bulk of a solid it will transfer energy to the environment. Depending on the boundary condition or contact with the environment this energy generates different movements in the environment. Shown in FIGS. 14*a*-14*c* are the illustrations of mechanisms for energy transfer from an acoustic wave in a solid 900 to a block 910. In FIG. 14*a*, block 910 has a friction contact (e.g. a pressure on the block) with solid 900. Surface particles (not shown) of the solid 900 have a retrograde elliptic motion, giving them a horizontal velocity at the peak of acoustic wave 920. This elliptic motion is opposite to the wave motion and causes block 910 to move in the opposite direction 930 of the wave propagation direction 940.

FIG. 14*b* illustrates a wave-action mechanism, again with a solid 900*a*, where block 910*a* is corrugated with the same period as the acoustic wave 920*a* of solid 900*a*, so block 910*a* will move along the same direction 930*a* as the wave propagation 940*a* with roughly the same phase velocity of acoustic wave 920*a*. Turning to FIG. 14*c*, shown is a boundary layer interaction condition. In this arrangement, solid 900*b* is again arranged with block 910*b*. However, here acoustic wave 920*b* acts as the boundary of viscous fluid 950*b* and radiates acoustic energy into the fluid, so the fluid will move along the same direction of acoustic wave 920*b*. Thus, block 910*b* on fluid layer 950*b*, causes the block to also move along the same 930*b* as acoustic wave 940*b*. Experimentation has shown that with the use of a "lamb-wave" membrane device consisting of 1 μm-thick ZnO, 0.4 μm-thick Al, and 2 μm-thick silicon nitride, the speed of the block (e.g., there is air between the block and the membrane) can reach more than 18 mm/s.

One reason to study the preceding energy transfer mechanisms is in the development of ultrasonic motors. The case in FIG. 14*b* is very difficult to realize in real world applications, but the case shown by FIG. 14*a* can effectively transfer force from the solid (which will be a stator in an ultrasonic motor) to the block (which would be a part of the rotor in an ultrasonic motor). More particularly, FIG. 14*a* illustrates the most popular design for an ultrasonic motor and has been studied extensively. For the case shown in FIG. 14*c*, while it can also transfer movement from the solid to the fluid and to the block, which means the ultrasonic motor with a fluid coupling between the stator and the rotor can also be developed, it does not effectively transfer force from the solid to the block.

Returning to traveling wave grid devices, such as those taught in documents discussed and/or incorporated herein by reference, disclosed are devices which permit focusing, separation and/or concentration of organic, inorganic and biomaterial particles which are effective in translating fluid within a layer of thickness equal to 5 times the spatial pitch of the traveling wave grid. As has been mentioned above, in these devices, particles, especially bio-materials, in the carrier medium may sediment out and adhere to the traveling wave grid surface causing loss in sample concentration and compromising reliability. Several methods have been discussed to reduce this adhesion, such as using special coatings and/or piezoelectric induced vertical vibrations to agitate the particulates. However, these elements and methods are used to just reduce the amount of adhesion of the particulates to the traveling wave grid surface, but they do not adjust or modify the transport of particulates in the carrier medium.

In the following discussion, further disclosed are devices and methods which also generate acoustic traveling waves (ATW) on the surface of the traveling wave grid using piezoelectric effect, which travels along the surface co-planar with the traveling wave grid. In this way not only will the surface vibrations be used to prevent sedimentation or settlement of particles and break Van der Waals bonds between the traveling wave grid surface and particles, the ATW direction may be designed to move with or against the traveling wave grid so as to enhance or reduce carrier medium and particle transport capabilities. One mode of usage is similar to the case shown in FIG. 14*c*. In an additive mode, the ATW will enhance the carrier medium delivery and improve efficiency of traveling wave grid devices. Stated another way, the ATW introduces another mechanism to help in more effective particle transport. This may improve the utilization of traveling wave grid devices as to bio-material in high viscosity or gel-like media.

Theoretically, any method or structure which can generate ATW on the surface of a traveling wave grid can be employed in the present concepts. As most of the acoustic traveling waves are generated by using piezoelectric materials, several such examples are given to generate ATW on the surface of a traveling wave grid. These structures can be classified into two categories: generating bulk acoustic traveling wave which includes surface movements, and generating only surface acoustic traveling wave. Of course, any other structures, such as many structures used in ultrasonic motors, can also be used.

Depicted in FIG. 15 is a side view of a traveling wave grid device 1000 which can generate ATW in and on the traveling wave grid, while also minimizing particle contact adhesion to the surface of the traveling wave grid. A substrate 1010 made from glass or other materials carries traveling wave grid electrodes 1012. Ends of the glass substrate are bonded to or have grown thereon to piezoelectric sections 1016 (with electrodes 1018, 1020) and 1022 (with electrodes 1024, 1026), with one piezoelectric section (e.g., 1016) used as a generator and the other piezoelectric section (e.g., 1022) used as an absorber. When piezoelectric section 1016 is used as a generator, a voltage via power source 1028 is applied, generating a mechanical vibration. This mechanical vibration generates acoustic wave 1025 (in glass substrate 1010, but shown in the figure below glass substrate 1010, for clarity) which travel from left to right 1030, and the other piezoelectric section 1022 absorbs the acoustic energy. That is, the acoustic (mechanical) energy is transformed to electric energy and consumed by resistance network 1032. As there is no acoustic wave reflected from the right end, an ATW 1025 is generated in glass substrate 1010, which enhances the delivery of the carrier medium from left to right 1030. In particular, the ATW wave 1025 moves in the same direction as the flow direction 1034 caused by operation of the traveling wave grid. Reversing directions and polarities (e.g., power source 1028 is on the right-hand side and resistance network 1032 is on the left-hand side) cause the ATW 1025 to act in the opposite direction (e.g., see 1030a), and the carrier medium delivery will be reduced.

In particular, the motivation of the ATW 1025 will be acting against (e.g., 1030a) the flow direction 1034 generated by the traveling wave grid operation. When the ATW travels in the traveling wave grid area, it also generates surface vibrations as previously discussed, which are used to prevent settlement or sedimentation of particulates, and to break the Van der Waals bonding between the traveling wave grid surface and particles.

Figure 15:
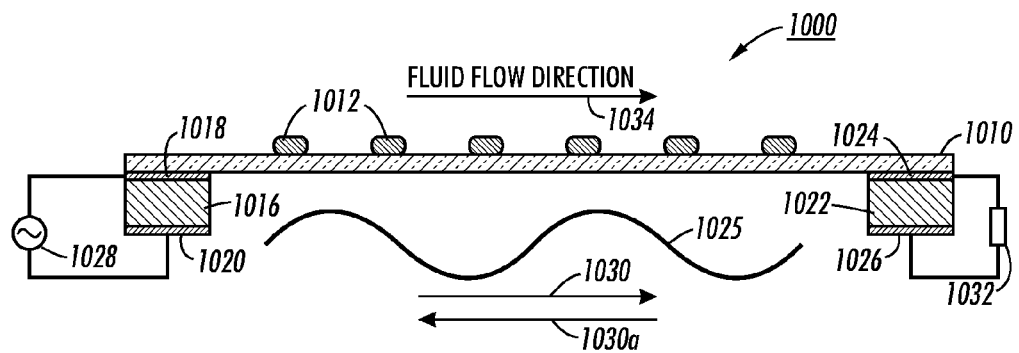
FIG. 15 depicts a first embodiment of a structure combining electrostatic traveling wave and acoustic traveling wave (ATW) operation.
Figure 16:
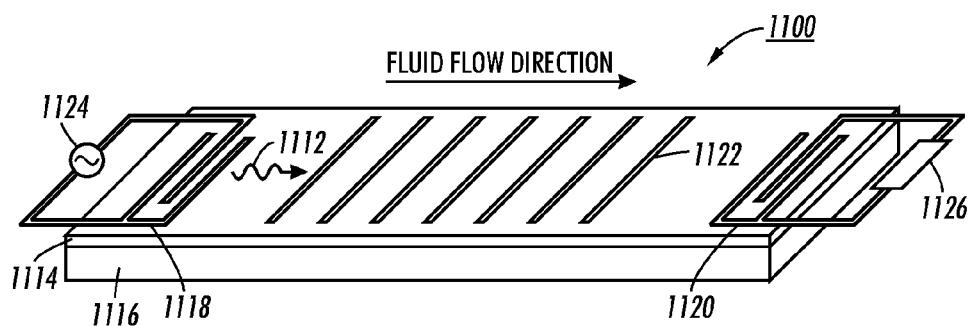
FIG. 16 is a second example of a structure combining electrostatic traveling wave device concepts and acoustic traveling wave (ATW) concepts.

Shown in FIG. 16 is an embodiment for a traveling wave grid device 1100, which employs a surface launched acoustic wave to generate an ATW wave 1112 only on the surface of the traveling wave grid. In order to generate surface ATW wave 1112, a piezoelectric material 1114 such as a ZnO thin film is deposited on a substrate 1116 such as glass. Then inter-digitated (IDT) electrodes 1118, 1120 are formed on both ends of piezoelectric film 1114, and traveling wave grid electrodes 1122 are formed on piezoelectric film 1114. If it is necessary (e.g., for isolation), a thin insulating/dielectric film (not shown) such as Parylene or silicon oxide/nitride film may be deposited on the surface of the piezoelectric film before fabricating traveling wave grid electrodes 1122, so that the voltage applied by a voltage source (not shown) on the traveling wave grid will not affect the operation of the piezoelectric film. Using the IDT electrodes 1118 on the left end connected to power source 1124 as the generator and the IDT electrodes 1120 on the right end connected to resistance network 1126 as the absorber, a continuous surface acoustic traveling wave can be generated which enhances the fluid delivery from the left side to the right side. Reversing the directions and polarities, as discussed in FIG. 15, will result in a 180 degree flip in directionality.

Figure 17:
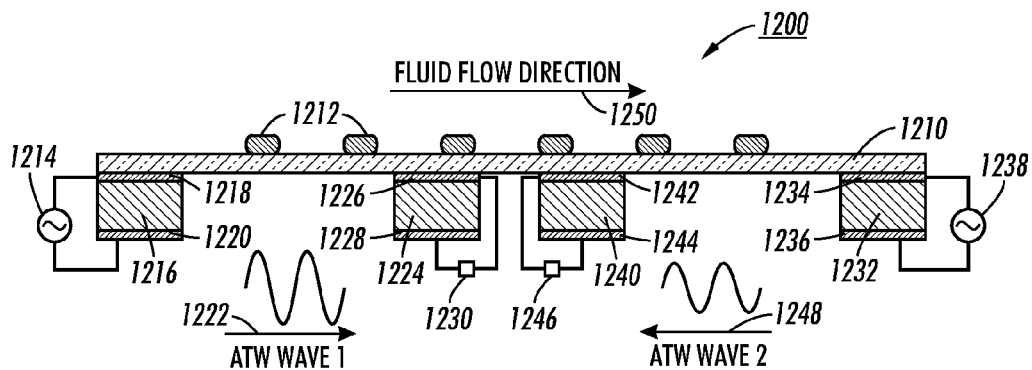
FIG. 17 sets forth a device using distributed piezoelectric elements to locally change the ATW amplitude and direction in combination with an electrostatic traveling wave grid device.

Turning to FIG. 17, instead of generating a homogenous ATW over the entire electrostatic traveling wave grid area, a device such as traveling wave grid device 1200 can be designed where the traveling wave grid area also selectively overlaps with sub-areas of piezoelectric elements with distributed addressing and control. With more particular attention to traveling wave grid device 1200, similar to previous embodiments, provided is glass substrate 1210, on which are located traveling wave grid electrodes 1212. However, in this embodiment, distributed piezoelectric elements are used to locally change the ATW amplitude and direction. More specifically, power source 1214 is connected to piezoelectric element 1216 via electrodes 1218 and 1220. Activation of power source 1214 generates an ATW wave 1222, which is received by an absorption network comprising piezoelectric element 1224, having electrodes 1226 and 1228, connecting the piezoelectric element 1224 to a resistance network 1230. By this design, the mechanical vibrations which generate the ATW wave 1222 are transformed into electrical energy by the piezoelectric element 1224, and consumed by resistance network 1230.

With continuing attention to FIG. 17, oppositely positioned generators and absorption networks are illustrated. For example, piezoelectric element 1232 having electrodes 1234 and 1236 is operationally connected to power source 1238. Then, a spaced absorption network consisting of piezoelectric element 1240 with electrodes 1242 and 1244 connected to resistance network 1246 act to absorb ATW wave 1248 generated by piezoelectric material 1232. As can be seen by FIG. 17, ATW wave 1222 travels in the same direction as the flow direction 1250 created by the traveling wave electrodes. On the other hand, ATW wave 1248 travels in the opposite direction. Thus the ATW intensity (amplitude) and propagation direction can be controlled locally, so that the manipulation ability of the device can be fine-tuned locally.

The above has been described with reference to the preferred embodiments. Obviously, modifications and alterations will occur to others upon reading and understanding the preceeding detailed description. It is intended that the descriptions be construed as including all such modifications and alterations insofar as they come within the scope of the appended claims or the equivalents thereof.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for transporting particles in a carrier medium adapted for retention and migration of the particles, said system comprising:
    a substrate;
    a travelling wave grid, including a plurality of spaced, electrically conductive electrodes carried by the substrate, wherein the electrodes carried by the substrate are part of a surface of the traveling wave grid which generates an acoustic traveling wave;
    at least one vibration generator positioned in relation to the substrate to impart vibration to the carrier medium; and
    at least one absorber positioned in relation to the substrate to absorb at least a portion of the acoustic travelling wave.

2. The system of claim 1 wherein the at least one vibration generator and the at least one absorber include a piezoelectric material.

3. The system according to claim 2 wherein the piezoelectric material is divided into sub-areas, at least one of the sub-areas being part of the at least one vibration generator and at least one other of the sub-areas being part of the at least one absorber.

4. The system according to claim 3 wherein the sub-areas further include distributed addressing and control.

5. The system of claim 4 wherein the at least one vibration generator and the at least one absorber are positioned and configured to act as a pair.

6. The system of claim 5, wherein there are a plurality of vibration generator and absorber pairs.

7. The system of claim 1 wherein the at least one absorber is connected to a resistive network.

8. The system of claim 1 wherein the at least one vibration generator is connected to a power source.

9. The system of claim 1 wherein the traveling wave grid employs a surface launched acoustic wave to generate an acoustic traveling wave only on the surface of the traveling wave grid.

10. The system of claim 2 wherein the piezoelectric material has a thickness of between about 10 μm to 50 μm.

11. The system according to claim 1 wherein the agitation of the traveling wave grid surface creates about a 9 nm to 12 nm displacement between the traveling wave grid surface and the liquid carrier medium, which is of a sufficient amount to prevent settlement or sedimentation of particles, and to break Van der Waals bonding between the traveling wave grid surface and the particles.

12. The system according to claim 1 wherein the vibration generator includes a plurality of distributed piezoelectric elements.

13. The system according to claim 12 wherein the plurality of distributed piezoelectric elements provides localized control of vibrations to the traveling grid surface.

14. The system according to claim 12 wherein the plurality of distributed piezoelectric elements are located on a bottom surface of the substrate.

15. The system according to claim 12 wherein the plurality of distributed piezoelectric elements are located on an upper surface of the substrate.

16. The system according to claim 1, wherein the at least one vibration generator includes a continuous piece of piezoelectric material located on a lower surface of the substrate.

17. The system according to claim 1, wherein the at least one vibration generator includes a continuous piece of piezoelectric material located on an upper surface of the substrate.

18. The system according to claim 1, wherein the at least one substrate includes a recessed portion in which at least one component of the at least one vibration generator is located.

* * * * *